United States Patent
Mercier et al.

(10) Patent No.: US 9,687,926 B2
(45) Date of Patent: Jun. 27, 2017

(54) TRAILING EDGE MACHINING OF A WORKPIECE

(75) Inventors: Carl W. Mercier, S. Willington, CT (US); Daniel E. Quinn, Windsor, CT (US); David J. Hiskes, Vernon, CT (US); Paul M. Pellet, Arlington, TX (US); Michael L. Miller, Euless, TX (US)

(73) Assignee: United Technologies Corporation, Farmington, CT (US)

( * ) Notice: Subject to any disclaimer, the term of this patent is extended or adjusted under 35 U.S.C. 154(b) by 1814 days.

(21) Appl. No.: 12/417,714

(22) Filed: Apr. 3, 2009

(65) Prior Publication Data

US 2010/0252533 A1    Oct. 7, 2010

(51) Int. Cl.
| | |
|---|---|
| *B23H 1/04* | (2006.01) |
| *B23H 1/00* | (2006.01) |
| *B23H 9/10* | (2006.01) |
| *B23H 11/00* | (2006.01) |
| *B23Q 3/06* | (2006.01) |
| *B24B 19/14* | (2006.01) |
| *B24B 41/06* | (2012.01) |

(52) U.S. Cl.
CPC .......... *B23H 9/10* (2013.01); *B23H 11/003* (2013.01); *B23Q 3/063* (2013.01); *B24B 19/14* (2013.01); *B24B 41/06* (2013.01)

(58) Field of Classification Search
CPC ........ B23H 11/003; B23H 9/10; B23Q 3/063; B24B 19/14; B24B 41/06
USPC ....... 219/69.11, 69.15, 69.2, 158, 161, 69.17
See application file for complete search history.

(56) References Cited

U.S. PATENT DOCUMENTS

| | | | |
|---|---|---|---|
| 3,818,646 A * | 6/1974 | Peterson | 451/365 |
| 3,981,786 A * | 9/1976 | Andrews | 204/224 M |
| 4,638,602 A | 1/1987 | Cavalieri | |
| 4,829,720 A | 5/1989 | Cavalieri | |
| 6,068,541 A | 5/2000 | Dwyer | |
| 6,106,204 A * | 8/2000 | Dansereau et al. | 409/183 |
| 6,287,182 B1 | 9/2001 | Dwyer | |
| 6,369,343 B1 * | 4/2002 | Krenz et al. | 219/69.11 |
| 6,560,890 B1 | 5/2003 | Madge et al. | |

(Continued)

FOREIGN PATENT DOCUMENTS

| | | |
|---|---|---|
| EP | 0453391 A2 | 4/1991 |
| EP | 1321236 A1 | 11/2001 |
| GB | 814202 | 4/1956 |

OTHER PUBLICATIONS

EP Search Report—10250721.7-1262.

*Primary Examiner* — Tu B Hoang
*Assistant Examiner* — Diallo I Duniver
(74) *Attorney, Agent, or Firm* — Kinney & Lange, P.A.

(57) ABSTRACT

A method of securing an workpiece for machining the trailing edge. The workpiece has a platform from which extends an airfoil, the airfoil including a leading edge and a trailing edge, and a pressure side and a suction side. A fixture with at least one locating datum that relates to the platform and at least one locating datum that relates to the leading edge is provided. The fixture does not contact the trailing edge of the workpiece. The workpiece is positioned so that the platform is against the related locating datum and the leading edge is against the related locating datum. The workpiece is secured within the fixture, and the trailing edge of the workpiece is machined.

6 Claims, 5 Drawing Sheets

(56) References Cited

U.S. PATENT DOCUMENTS

| | | | |
|---|---|---|---|
| 6,627,833 | B2 | 9/2003 | Varsell et al. |
| 6,791,054 | B1 | 9/2004 | Mertz |
| 6,844,515 | B2 | 1/2005 | Byrns et al. |
| 6,844,518 | B1 * | 1/2005 | Coons et al. ............... 219/69.15 |
| 6,850,874 | B1 * | 2/2005 | Higuerey et al. ................. 703/4 |
| 7,080,434 | B2 | 7/2006 | Jones et al. |
| 7,291,800 | B2 | 11/2007 | Varsell et al. |
| 7,334,306 | B2 * | 2/2008 | Beverley et al. ............ 29/281.1 |
| 7,334,331 | B2 | 2/2008 | Bouchard et al. |
| 2003/0066820 | A1 | 4/2003 | Byrnes et al. |
| 2005/0268462 | A1 * | 12/2005 | Beverley et al. .......... 29/889.21 |

* cited by examiner

US 9,687,926 B2

TRAILING EDGE MACHINING OF A WORKPIECE

BACKGROUND

This disclosure generally relates to an electrode discharge machining (EDM) apparatus and more particularly to the EDM apparatus having a fixture for securing a workpiece that may be a blade of a gas turbine engine, and method of operation.

A gas turbine engine has several major stages including the compressor, the combustor, and the turbine. Compressed gases leave the compressor and are ignited and burned with the addition of fuel in the combustor. The high pressure combusted gases are then directed through a restricting nozzle and into one or more alternating stages of rotating blades and stationary vanes. The efficiency of the engine, and therefore fuel usage, is greatly dependent upon the nozzle area. Precise and accurate control of nozzle area exiting the combustor is desirable for purposes of maximizing overall engine efficiency and reducing fuel consumption.

To create parts that maximize engine efficiency, electric discharge machining (EDM) is used. EDM is a process in which an electrically conductive metal workpiece is shaped by removing material through melting or vaporization by electrical sparks and arcs. The spark discharge and transient arc are produced by applying controlled pulsed direct current between the workpiece (typically anodic or positively charged) and the tool or electrode (typically the cathode or negatively charged). The end of the electrode and the workpiece are separated by a spark gap generally from about 0.01 millimeters to about 0.50 millimeters, and are immersed in or flooded by a dielectric fluid. The DC voltage enables a spark discharge charge or transient arc to pass between the tool and the workpiece. Each spark and/or arc produces enough heat to melt or vaporize a small quantity of the workpiece, thereby leaving a tiny pit or crater in the work surface. The cutting pattern of the electrode is usually computer numerically controlled (CNC) whereby servomotors control the relative positions of the electrode and workpiece. The servomotors are controlled using relatively complex and often proprietary control algorithms to control the spark discharge and control gap between the tool and workpiece. By immersing the electrode and the workpiece in the dielectric fluid, a plasma channel can be established between the tool and workpiece to initiate the spark discharge. The dielectric fluid also keeps the machined area cooled and removes the machining debris. An EDM apparatus typically includes one or more electrodes for conducting electrical discharges between the tool and the workpiece.

During airfoil manufacture, the trailing edge of the airfoil is machined. More specifically, an electric discharge machining process is used to shape the airfoil trailing edge into the desired dimensions. Electrical discharge machining is a well known process for forming features, such as holes, slots and notches of various shapes and configurations, in an electrically conductive workpiece. Conventional EDM apparatuses typically employ an electrode, having a specific shape, that is advanced toward the workpiece. A suitable power supply is applied to create an electrical potential between the workpiece and electrode for forming a controlled spark which melts and vaporizes the workpiece material to form the desired feature. The cutting pattern of the electrode is usually computer numerically controlled (CNC) whereby servomotors control the relative positions of the electrode and workpiece. During machining, the electrode and workpiece are immersed in a dielectric fluid, which provides insulation against premature spark discharge, cools the machined area, and flushes away the removed material.

At least some known EDM fixtures are used to machine turbine airfoil assemblies. Because of a curvature of the airfoil, accurately forming features on the airfoil, including the openings in the airfoil and the profile of trailing edge, are a time consuming and difficult task. To facilitate improving the EDM process, a clamping apparatus is used to secure the workpiece. The consistent, repeatable locating and securing of blade assemblies facilitates precision machining. Most known clamping assemblies or fixtures are complex and expensive, and do not assure a finished workpiece that meets specifications. Typically, a fixture relies on a specific point on the platform adjacent the airfoil to locate the workpiece within the fixture. Due to the curvature of the airfoil and location of the clamping or securing mechanism(s), this locating datum on the platform may not create consistent, uniform parts from workpieces placed within the fixture.

SUMMARY

In one embodiment, a method of securing a workpiece for machining the trailing edge is disclosed. The workpiece has a platform from which extends an airfoil, the airfoil including a leading edge and a trailing edge, and a pressure side and a suction side. A fixture with at least one locating datum that relates to the platform and at least one locating datum that relates to the leading edge is provided. The fixture does not contact the trailing edge of the workpiece. The workpiece is positioned so that the platform is against a related locating datum and a leading edge is against the related locating datum. The workpiece is secured within the fixture, and the trailing edge of the workpiece is machined.

In another embodiment, an electric discharge machining (EDM) apparatus for machining a workpiece having a platform and an airfoil joined to the platform is disclosed. The EDM apparatus has an EDM head, an electrode holder, an electrode shaped to a working profile of the workpiece, and a fixture with a plurality of locators to position the workpiece with respect to the electrode based on a plurality of datums of the workpiece, wherein the locators placed at positions other than the working profile.

In yet another embodiment, a method of machining a trailing edge of a workpiece is disclosed. The workpiece is positioned in a fixture wherein the trailing edge is suspended at a known location with respect to the fixture based on workpiece locating datums at positions other than the trailing edge. The workpiece is secured within the fixture, the trailing edge is machined.

DETAILED DESCRIPTION

Figure 1:
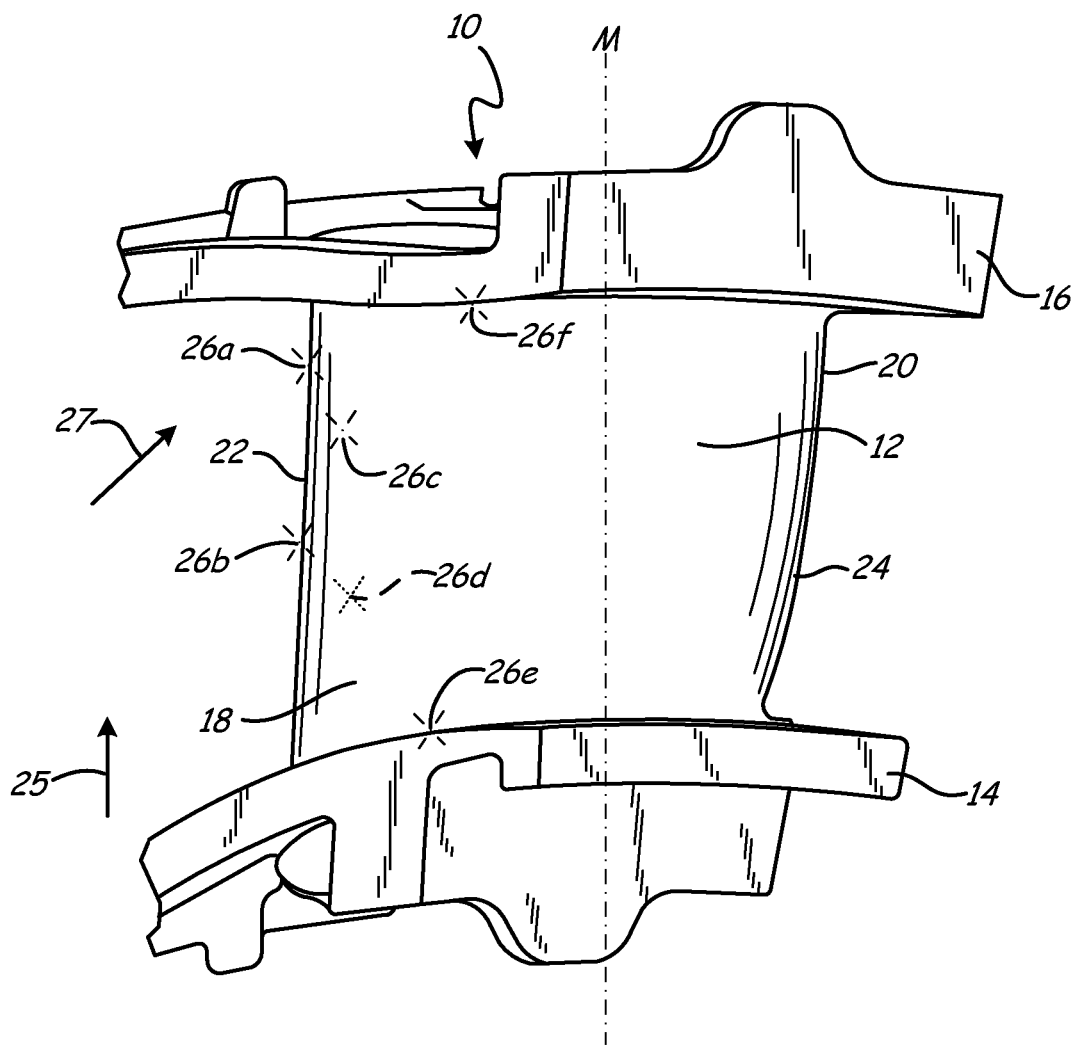
FIG. 1 is a perspective view of a turbine engine vane that may be a workpiece for the present invention.

An EDM process of the present invention is applied to a workpiece 10 (as best illustrated in FIG. 1) that may be a vane or blade for a turbine engine. As illustrated, workpiece 10 is a vane singlet that has airfoil 12 between platform 14 and shroud 16. Airfoil 12 has pressure side 18 and suction side 20 that extend between leading edge 22 and trailing edge 24. For a given stage of the turbine engine, airfoil 12 has a maximized chord length. A shorter chord length leads to a larger throat opening, and thus results in a less efficient engine. Thus, trailing edge 20 is machined to maximize the chord length of airfoil 12.

In general manufacturing of workpiece 10 and other parts, fixtures used for manufacturing the workpiece 10 have fixed locators to position workpiece 10 in the proper orientation for fabrication of workpiece 10. The fixed locators are usually positioned against the datums. The datums of the part are preset locations or points on the part that, when support is applied to those locations, prevent the part from translating along the three axes of a three axes orthogonal coordinate system (e.g., x, y, and z axes of the Cartesian coordinate system) and prevent the part from rotating about each of the three axes. Using the datums of the workpiece 10 locates the workpiece into a known and repeatable position, which can then be used for a subsequent machining operation, or for an assembly operation.

As illustrated in FIG. 1, workpiece 10 contains several datums 26a-26f. Datums 26a and 26b are collinear in the axial direction of airfoil 12 as represented by arrow 25, and datums 26c and 26d are collinear in the radial direction of airfoil 12 as represented by arrow 27. Datum 26e is located on platform 14 and Datum 26f is located on shroud 16. During the manufacturing of trailing edge 24 of airfoil 12, it is preferable to have an unobstructed path for the cutting tool. An unobstructed path allows for machining in a single operation, thus reducing cost and time required for manufacture of the part. In machining trailing edge 24, airfoil 12 is generally positioned into a fixture and secured at its datum points. Thus, it is important that the datums are positioned so as to not interfere with the machining operation.

Figure 2:
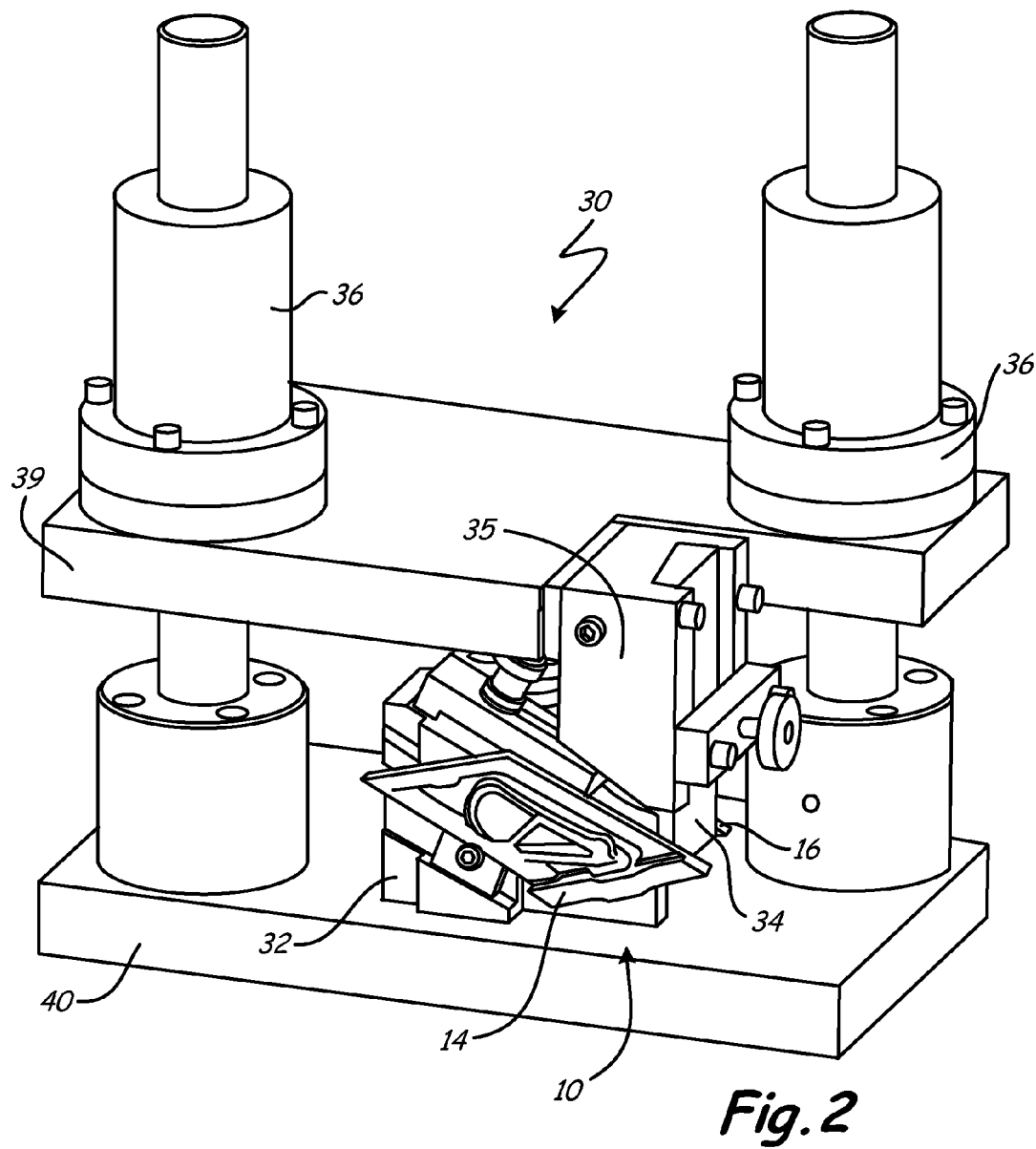
FIG. 2 is a perspective view of an electrical discharge machining (EDM) apparatus embodying the present invention.
Figure 3:
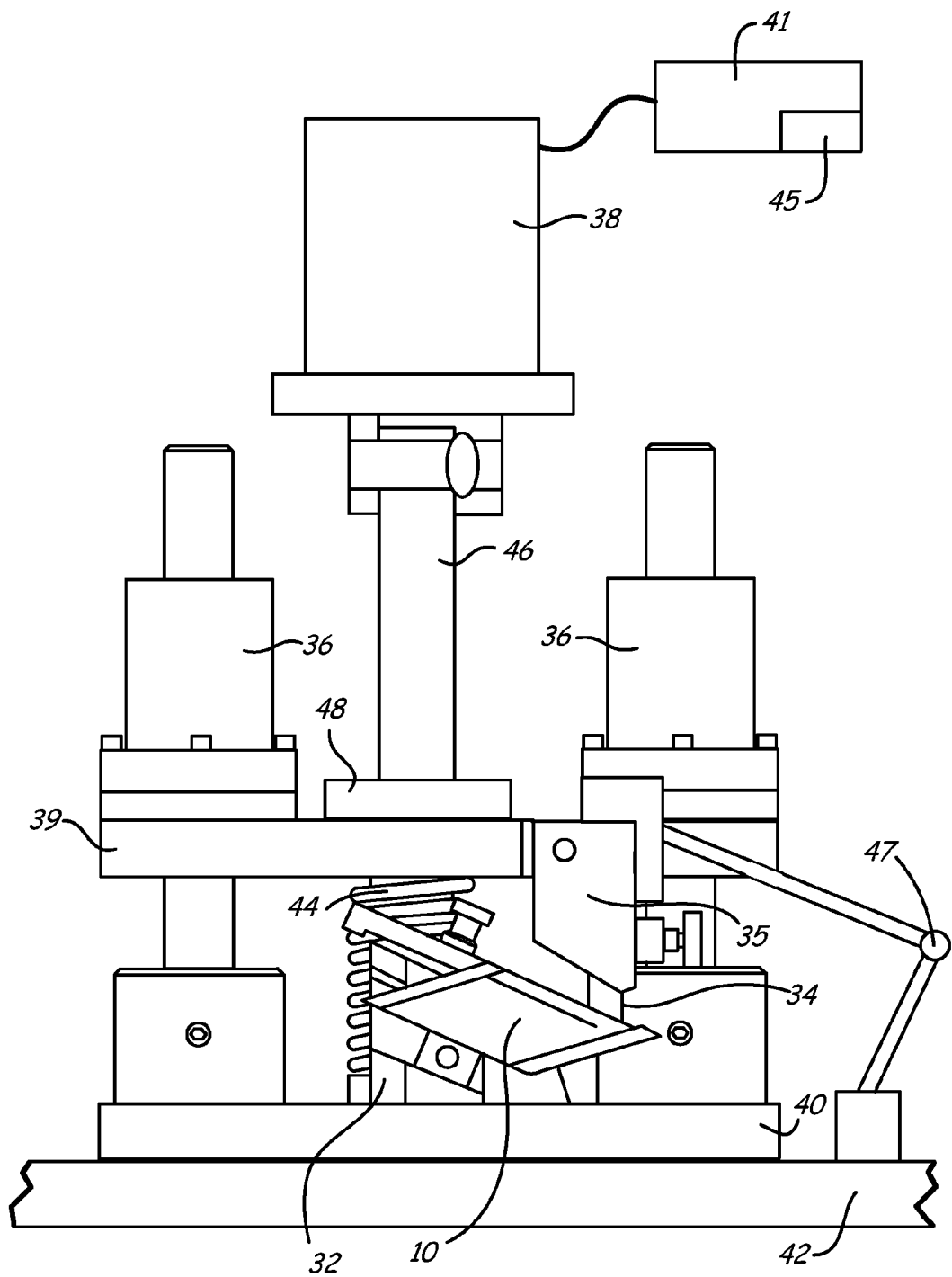
FIG. 3 is a front elevation view of the EDM apparatus.

More specific to the present invention, and referring to FIG. 2, electrical discharge machining (EDM) apparatus 30 includes fixture 32 to secure workpiece 10. FIG. 3 is a front elevation view of EDM apparatus 30 with fixture 32. EDM apparatus 30 may be used for a manufacturing process that includes the machining of workpiece 10. EDM, also referred to as spark erosion and electro erosion, is a common method of machining features into workpieces. EDM apparatus 30 includes fixture 32 for supporting workpiece 10, electrode 34, electrode holder 35, guides 36, servo motor 38 (shown in FIG. 3), top platen 39, bottom platen 40, spring 44, actuator 46, and actuator collar 48.

Components of EDM apparatus 30 are secured to machine table 42 (shown in FIG. 3), which provides a sturdy base. Machine table 42 contains vertical walls (not shown) that create a tank. During the EDM machining process, the tank is filled with dielectric fluid (e.g., deionized water). The fluid provides an insulating medium about the workpiece until desired spark conditions are produced, and then acts a conducting medium through which the spark can travel. The fluid also acts to flush disintegrated particles created by the spark away from the work area, and cools the interacting electrode and workpiece. In one embodiment, the fluid flows across the part through the use of a circulating system (not illustrated), which includes a discharge or suction port, a pump, and an inlet or pressure port. The fluid may contain additional additives to lubricate the pump and other circulatory systems components.

Bottom platen 40 of apparatus 30 secures to machine table 42, and fixture 32 of apparatus 30 is secured to bottom platen 40. Fixture 32 positions and secures workpiece 10 with respect to the electrode 34. Spring 44 creates an open space between top platen 39 and bottom platen 40, which allows for access to fixture 32 when EDM apparatus 30 is not running. Fixture 32 can then be loaded with workpiece 10, or removed and replaced with a different fixture.

Actuator 46 extends through spring 44 and affixes to bottom platen 40, and may be any common actuating device known in the industry, such as an electric screw actuator. During operation, servo motor 38 drives actuator 46, which is connected to collar 48. Collar 48 is attached to top platen 39, and the force exerted by collar 48 pushes top platen 39 towards the fixed bottom platen 40, compressing spring 44 in the process. Guides 36 are placed at varying spots adjacent fixture 32 to keep the platens 39 and 40 aligned during operation of the EDM apparatus 30. Upon completing the machining process, actuator 46 is retracted by motor 38, and spring 44 pushes top platen 39 into the original position.

In one example, electrode 34 is connected to top platen 39. During operation, actuator 46 also advances electrode 34 towards the workpiece 10 to create a suitable gap, and work in conjunction with an EDM head 41. EDM head 41 controls servo motor 38 that maintains the spark gap distance through control signals received from a microprocessor based controller 45, which is well known within the art. Controller 45 will sense the gap voltage, determine the offset from a preset value, and send a control signal to servo motor 38 to advance or retract. In another example, EDM head 41 may also have multi-axis positioner 47 that controls the placement of electrode holder 35 with respect to the workpiece.

Electrode 34 is either a hollow or solid core structure constructed from any electrically conductive material, including tungsten, copper tungsten carbide, copper graphite alloy, graphite, tantalum tungsten alloy, silver tantalum alloy, or other alloys. Depending on the material used, electrode 34 may be consumable, and wear in a ratio generally around 100 to 1 of workpiece material removed to electrode material removed. The size of electrode 34 will vary depending on the feature to be formed by the machining process.

Once electrode 34 and workpiece 10 receive suitable electrical cabling (not shown), power is supplied to the cabling. The current through the cabling creates an electrical potential between electrode 34 and workpiece 10, which creates a spark between electrode 34 and workpiece 10. The heat produced by the spark melts or vaporizes a small portion of workpiece 10, typically in the form of minute hollow spheres. As voltage and amperage increase, the amount of material removed also increases. Thus, by controlling the current and other variables of the electric pulse in an environment that promotes spark generation, EDM removes material from workpiece 10. By controlling movement of electrode 34 relative to workpiece 10, EDM apparatus 30 can produce many desired features, such as notches, apertures and profiles. To ensure accurate placement of the desired features on the workpiece, fixture 32 must position the workpiece.

Figure 4:
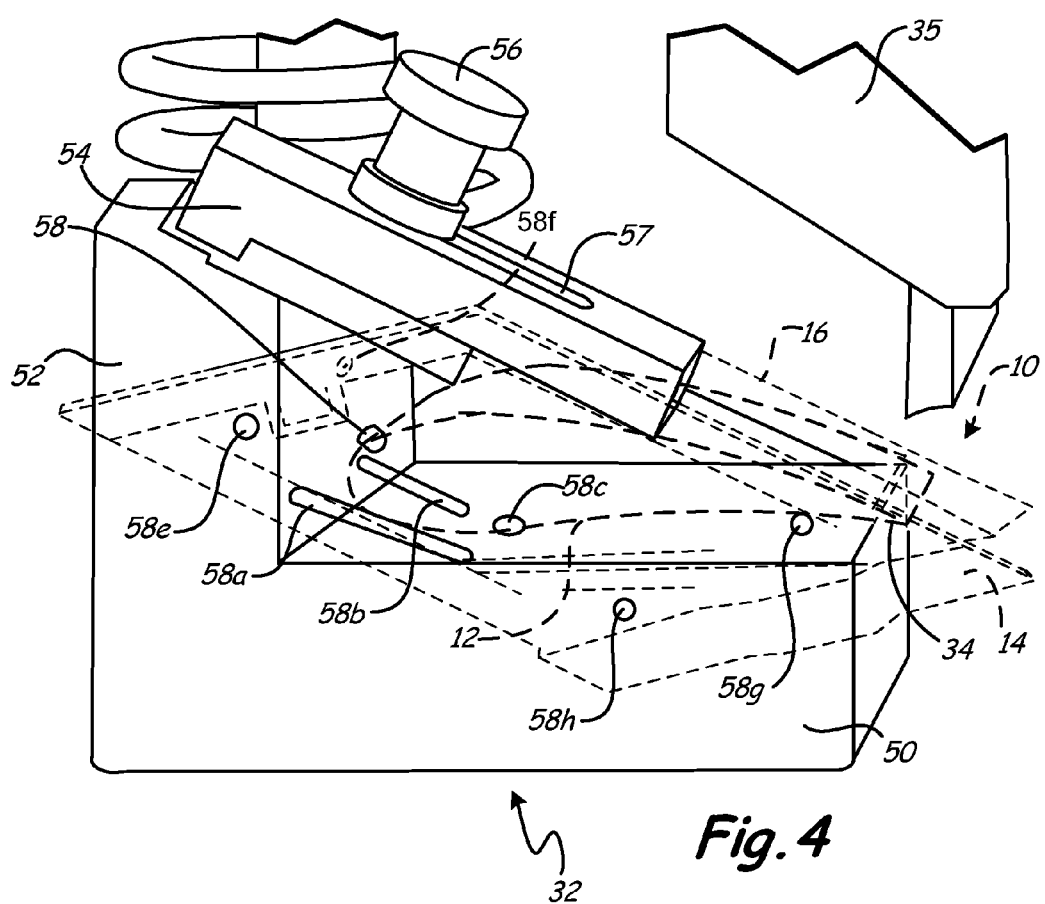
FIG. 4 is a perspective view of a fixture of the EDM apparatus with the work piece illustrated in phantom.

Referring to FIG. 4, fixture 32 has base 50 connected to support 52. Fixture 32 is constructed from materials known to those of skill in the art for tooling, such as metals and alloys. Base 50 connects to bottom platen 40 of EDM apparatus 30, and may be secured thereto with fasteners, or may be an integral part with the lower portion thereof. Fixture 32 is made to be removable from EDM apparatus 30, which allows for EDM apparatus 30 to be utilized for machining various other parts as well as workpiece 10.

Support 52 extends vertically from base 50, and is again secured with fasteners or may be integral with base 50. Support 52 contains clamp 54 for securing workpiece 10 within fixture 32. In the embodiment illustrated, clamp 54 is a screw clamp that contains slot 57 for varying position of the clamping mechanism with respect to workpiece 10. Clamp 54 secures workpiece 10 by tightening screw 56, although in other embodiments toggle, cam, lever, and other types of clamps may be utilized.

Fixture 32 has a plurality of locators 58 (see FIG. 4) that generally correspond respectively to a plurality of datums 26 (see FIG. 1) associated with various features of the workpiece 10, and thereby forming a plurality of datum references or pairs. As illustrated in FIG. 4, fixture 32 contains the plurality of locators 58 being about eight locators 58a-58h. Workpiece 10 contains the plurality of datums 26 being about six datums 26a-26f in FIG. 1, but may contain more to create a matching relationship with the number of locators desired in fixture 32. More specifically, the locator 58a may align with a workpiece feature being platform 14, locators 58b, 58c align with a feature being the leading edge 22, locator 58d aligns with a feature being the pressure side 18 of the airfoil 12, locator 58e aligns with a feature being the suction side 20 of airfoil 12, and locator 58f aligns with a feature being the shroud 16 of workpiece 10. Locators 58a-58h may be pins, dowels, or similar reference point structures that are known within the art. Alternatively and wherein the datum 26 may also be a projecting feature of the workpiece 10, any locator 58 may also be a cavity or recess defined by fixture 32. In yet another example, at least six locators 58 are present, with two locators designed to reference each of the Cartesian ordinate, abscissa, and applicate (x, y, and z axes). In yet another embodiment, an additional platform locator 58h and locator 58e may position platform 14 of workpiece 10. Locator 58g may be used to additionally locate pressure side 18, as well as support airfoil 12 within fixture 32.

Base 50 and support 52 of fixture 32 provide a pocket for placement of the workpiece 10 in fixture 32. This pocket together with locators 58a-58h, generally conform to the shape of the workpiece 10. Locators 58a-58h create various contact points that engage the workpiece 10 at the datums 26, while clamp 54 secures the workpiece 10 within the pocket and against the locators 58a-58h. To electrically isolate or insulate the workpiece 10 from fixture 32, the surfaces or contact points of locators 58a-58h should be electrically non-conductive. Locators 58a-58h may be constructed from or coated with ceramic to prevent electrical current from passing through the workpiece to fixture 32.

Figure 5A:
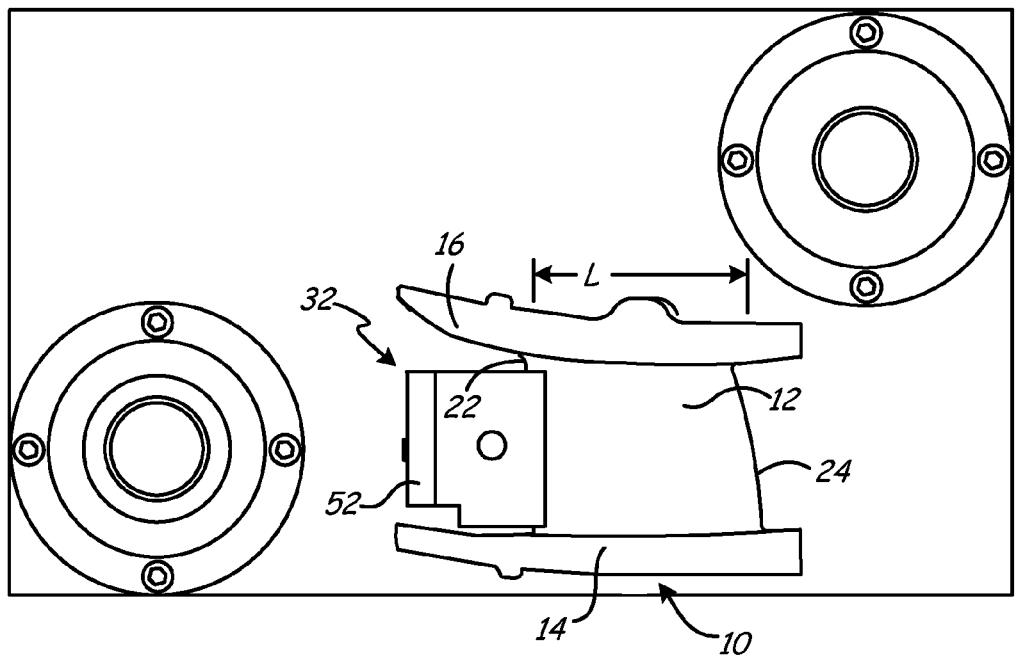
FIG. 5A and FIG. 5B are plan views of the EDM apparatus.
Figure 5B:
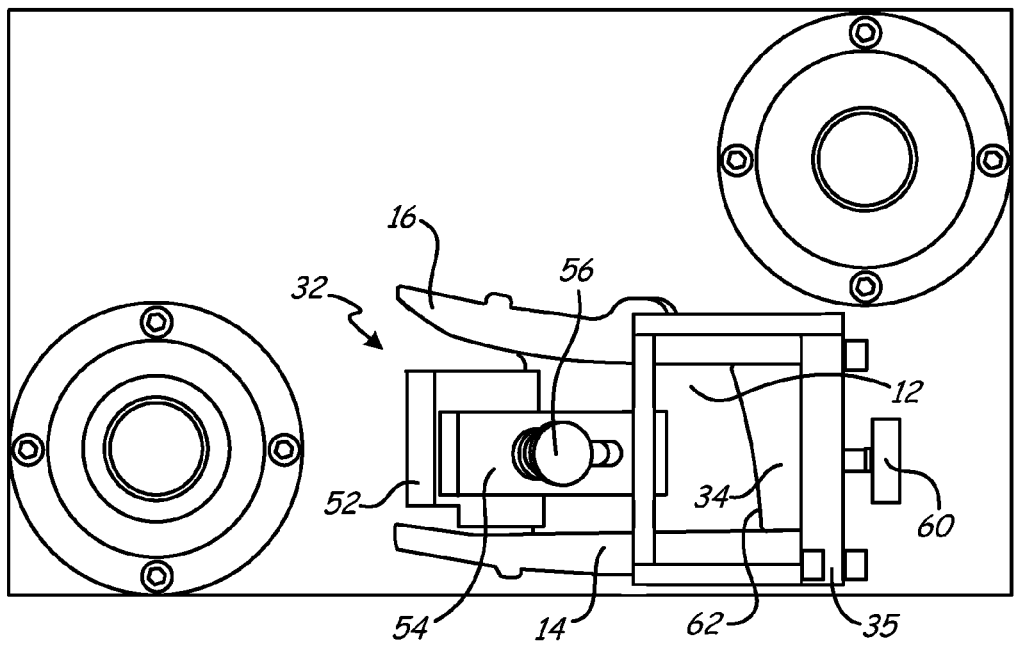

Referring to FIGS. 5A-5B, workpiece 10 is secured by fixture 32 through the use of clamp 54. Clamp 54 is illustrated as a singular securing device, but in other examples may contain multiple securing devices. Workpiece 10 is placed on fixture 32, assuring that locators 58a-58h contact the related datums 26 of the assembly 10, and so that trailing edge 24 of airfoil 12 extends past base 50. Trailing edge 50 is spaced from base 50 to allow use of a bypass electrode 34 in EDM apparatus 30.

Electrode 34 secures within electrode holder 35 through the use of fastener 60, that may be a screw clamp as illustrated or any other of a variety of fasteners. Clamp 60 allows for quick removal of electrode 34 if damaged, or if EDM apparatus 30 is used for machining any variety of workpieces. When workpiece 10 is a turbine vane singlet or blade, electrode 34 has a working profile 62 that mirrors the trailing edge profile of workpiece 10. In the example illustrated, electrode 34 is a solid piece, or bypass plunge-type electrode. In alternate examples, the electrode may be a comb type design, that is, contain surfaces for creating the working profile 62 as well as projections for creating cooling apertures in trailing edge 24 of the airfoil 12.

A confined and limited space is available between the fixture and the rest of the components of the EDM apparatus 30, including the tank that contains fixture 32, as well as the electrode holder 35 and electrode 34 itself. Clamp 54 is positioned to both secure workpiece 10 within fixture 32 as well as assure that electrode 34 has a clear path of travel. In one example, clamp 54 does not contact workpiece 10 beyond midpoint "M" toward trailing edge 24 of workpiece 10. In one example, the path of travel for the electrode is linear. In other examples, electrode 34 may take a varying, non-linear path during the machining operation, such as when creating both trailing edge apertures and the trailing edge profile of a workpiece. In the example illustrated, clamp 54 is a singular structure capable of securing workpiece 10 against all locators 58a-58h in fixture 32, although it is possible to have a series of devices to secure the workpiece, which may be either individually or singularly actuated to secure the workpiece in fixture 32.

In one example, locators 58a-58h are all removable structures, such as dowels and pins. The removable structures may be replaced with differing sized pieces to make fixture 32 a more universal tool capable of receiving various sized workpieces. Similarly, electrode 34 may be designed for a specific stage of a particular engine, and then may be replaced within holder 35 depending upon the part being worked on.

Fixture 32 is created utilizing the optimal chord length specification. Optimal chord length may be a nominal length that is maximized for a specific turbine engine stage. Several datums 26a-26f are selected from the specification that are then translated into locators 58a-58f in fixture 32. Locators 58a-58f are used to position workpiece 10. Workpiece 10 is placed in fixture 32, with the selected datums 26a-26f positioned against locators 58a-58f in fixture 32. For example, if the selected datums from 26a-26f are on leading edge 22 and platform 14, workpiece 10 is positioned so that the datum points on workpiece 10 contact locators 58 that relate to leading edge datum, i.e. 26a or 26b, and platform datum, i.e. 26e. Fixture 32 is secured into EDM apparatus 30, and the tank is filled with the dielectric fluid.

In one example, workpiece 10 already has a fabricated leading edge 22. Because the trailing edge 24 is being machined, and the optimal chord length is known, it is possible to position workpiece 10 utilizing leading edge 22 as a datum 26. The current fixturing system that relies on leading edge 24, which directly relates the datums 26a-26f and locators 58a-58h to airfoil 12 of workpiece 10. The direct relationship allows for a maximized chord length "L" (as illustrated in FIG. 5A) that is preserved during the machining process. Additional datums 26a-26f may be utilized for assuring specifications are met for all three dimensions of the Cartesian coordinate system. In one embodiment, all datums 26a-26f are located in an area forward of a midpoint "m" (as illustrated in FIG. 1) of airfoil 12 towards leading edge 22. These datums 26a-26f may be on platform 14, pressure side 18, suction side 20, and shroud 16 (if present on the workpiece).

Because working profile 62 is being machined to specification, it is preferred that fixture 32 not interfere with the machining operation in this area. Fixture 32 is designed so that trailing edge 24 of workpiece 12 is not contacted by the fixture. Hence, datums 26 are selected and locators 58 positioned adjacent leading edge 22 and not trialing edge 24, and clamp 54 is designed so as to not interfere with the machining process. This design greatly increases the speed of the machining process, and saves time and reduces the cost of the part.

Trailing edge 24 of workpiece 10 is not contacted by fixture 32, thus allowing a clear path for electrode 34 to cut while not contacting fixture 32. Fixture 32 allows for designing of a bypass electrode 34, because fixture 32 will not interfere with the machining process. Trailing edge 24 can be machined without repositioning workpiece 10. Electrode 34 can travel in a straight path, or in a multi-axis path. After workpiece 10 and electrode 34 are secured, the EDM apparatus 30 settings are programmed. Workpiece 10 is fabricated by directing electrode 34 towards trailing edge 24 of workpiece 10. After fabrication, electrode 34 is retracted, the tank is drained of the dielectric fluid, and clamp 54 holding workpiece 10 is released. Workpiece 10 is removed. Another workpiece of the same design may then be loaded into EDM apparatus 30. In another example, fixture 32 is then removed and replaced, as is electrode 34, and EDM apparatus 30 is reset to fabricate a different workpiece.

Fixture 32 can be used for the fabrication of new parts or for the fabrication of remanufactured parts in a repair process. Although examples are described for vane singlets and individual blades, fixture 32 and the method of machining may be utilized for compound workpieces, i.e., workpieces that contain multiple airfoils per segment.

While the present invention has been described with respect to a singlet, it is possible to obtain such a single by splitting apart a segment with additional vanes, such as disclosed in commonly assigned U.S. Pat. App. Pub. No. 2008/0289179. Typically, this involves splitting apart a doublet to form two singlets, but can include splitting apart segments containing any number of vanes. Singlets split apart from larger segments exhibit characteristics that identify them as belonging to a particular position. For instance, a typical doublet includes a lead singlet and a trail singlet. For simplicity, these can be understood as left and right singlets, each have unique characteristics. Lead and trail (or left and right) singlets are not interchangeable, because they include things like flanges/tangs, seal retaining structures, cooling holes, and vane thicknesses that are uniquely associated with a lead or trail (or left or right) position.

During repair, a singlet separated from a large segment can be de-identified. De-identification involves removing material and/or adding material to the salvaged, engine-run singlet to make it "generic", that is, no longer identified with a particular position (e.g., lead or trail). De-identification can include machining (e.g., grinding, blending, electric discharge machining, drilling, etc.) as well as cleaning (e.g., aqueous cleaning, grit blasting, etc.), inspection (e.g., fluorescent penetrant inspection, visual inspection, dimensional measurements, etc.), and material application (e.g., welding, brazing, etc.). Typically, cooling baffles are removed from the singlet prior to de-identification, and retained to maintain serial number continuity, such as disclosed in commonly-assigned U.S. patent application Ser. No. 11/890,388. The de-identified singlet can later be re-identified to the same as before de-identification, or to a different configuration, and a previously-removed baffle re-installed. For instance, a lead singlet can be de-identified then re-identified as either a lead or trail singlet. This process helps increase the availability of salvaged parts.

Although the present invention is described with reference to preferred embodiments, workers skilled in the art will recognize that changes may be made in form and detail without departing from the spirit and scope of the invention.

The invention claimed is:

1. An electric discharge machining (EDM) apparatus for machining a workpiece, the EDM apparatus comprising:
    an EDM head;
    an electrode holder;
    an electrode for creating a trailing edge profile of the workpiece, the electrode shaped to a trailing edge profile specification for the trailing edge profile of an airfoil; and
    a fixture comprising at least one locator that relates to a platform datum of the workpiece, and at least one locator that relates to a leading edge datum of the airfoil of the workpiece, wherein the fixture is configured to secure the workpiece with respect to the EDM head so that a chord length of the airfoil is maximized, and wherein the fixture does not contact the trailing edge of the airfoil.

2. The EDM apparatus of claim 1 wherein the fixture further comprises at least six locators.

3. The EDM apparatus of claim 2 wherein all of the at least six locators contact the airfoil in an area of the airfoil from the leading edge datum to a midpoint of the airfoil.

4. The EDM apparatus in accordance with claim 1 wherein the fixture further comprises a clamp that secures the workpiece within the fixture.

5. The EDM apparatus of claim 4 wherein the clamp is positioned within the fixture to allow the electrode a clear path of travel in at least a linear path.

6. The EDM apparatus of claim 2 wherein at least two locators reference an ordinate, at least two locators reference an abscissa, and at least two locators reference an applicate of Cartesian coordinates of the workpiece.

* * * * *